United States Patent
Jasek et al.

[11] Patent Number: 5,938,521
[45] Date of Patent: Aug. 17, 1999

[54] PORTABLE GAMBREL

[76] Inventors: Victor Jasek, P.O. Box 249, Moulton, Tex. 77975; William P. Gerke, P.O. Box 294, East Bernard, Tex. 77435

[21] Appl. No.: 09/023,546

[22] Filed: Feb. 13, 1998

[51] Int. Cl.$^6$ .................................................. A22B 5/00
[52] U.S. Cl. .................................. 452/192; 452/189
[58] Field of Search ........................... 452/189, 191, 452/192

[56] References Cited

U.S. PATENT DOCUMENTS

| | | | |
|---|---|---|---|
| 2,710,766 | 6/1955 | Erlewine | 452/192 |
| 4,027,357 | 6/1977 | Morris | 452/192 |
| 4,580,317 | 4/1986 | Timothy | 452/192 |
| 5,071,389 | 12/1991 | Castle et al. | 452/192 |
| 5,288,265 | 2/1994 | Beason et al. | 452/192 |
| 5,304,091 | 4/1994 | Wilkinson | 452/189 |

FOREIGN PATENT DOCUMENTS 132551  7/1902  Germany ............................ 452/191

*Primary Examiner*—Willis Little
*Attorney, Agent, or Firm*—Kenneth H. Johnson

[57] ABSTRACT

A portable gambrel comprising a pair of sturdy bar arms rotatably supported in a triangular saddle member, each of said arms having a rotating hook at its outermost end. The arms may be rotated from the horizontal position to the vertical position for storage. In addition adjusting pins are provided such that the opposing arms may be secured in an intermediate position between the horizontal and vertical to provide a shorter distance between the hooks for a smaller carcass.

4 Claims, 5 Drawing Sheets

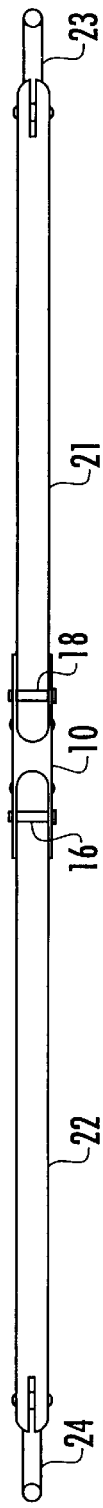
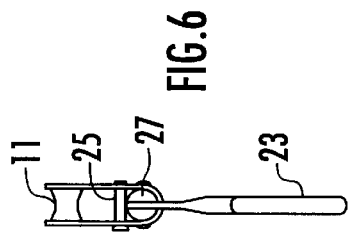
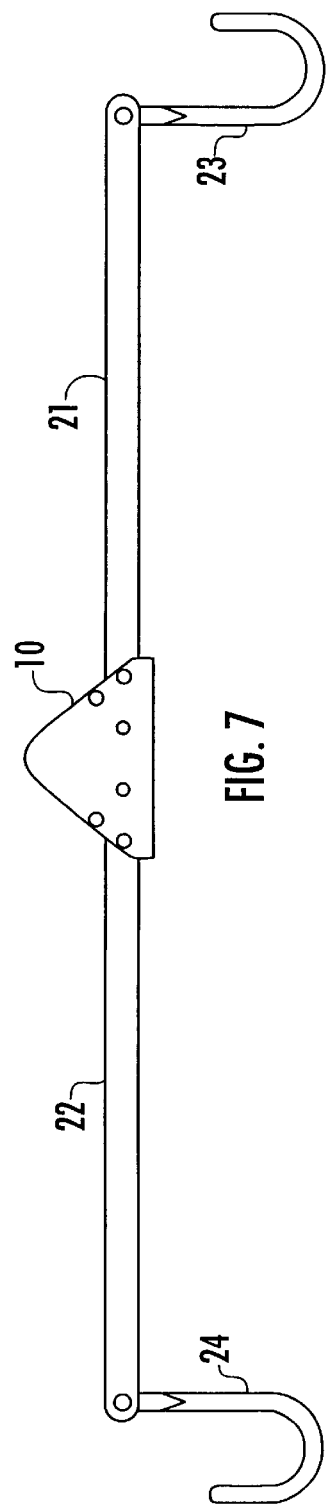
FIG. 5
FIG. 6
FIG. 7

PORTABLE GAMBREL

BACKGROUND OF THE INVENTION

1. Field of the Invention

The present invention relates to a portable gambrel for suspending an animal carcass for dressing the animal. More particularly the invention relates to a lightweight folding gambrel for use in field dressing a deer, hog or other animal

2. Related Art

Gambrels are devices that fasten to a carcass of an animal to permit a user to move or hoist the carcass into a required position for transportation, butchering, or similar procedures. Typical users include, but are not limited to, hunters, butchers, farmers and ranchers. Over the years numerous gambrels have been developed for this purpose. Among those patented include U.S. Pat. Nos. 4,580,317 and 5,071,389 both of which disclose portable type gambrels.

SUMMARY OF THE INVENTION

Briefly the present invention comprises a folding gambrel of sturdy bar steel arms rotatably attached to a saddle having a central hanger element. At the distal ends of each of the bar steel arms is a hook pivotally mounted for holding the back feet of a carcass to be dressed. The hooks freely rotate at the ends of the folding arms. Removable pins are located through holes on the saddle to adjust the angle of the arms to shorten the distance between the ends to accommodate a smaller carcass.

BRIEF DESCRIPTION OF THE DRAWING

FIG. 5 is a top view of the fully opened portable gambrel.

FIG. 6 is a side view of the portable gambrel.

FIG. 7 is a front view of the portable gambrel in the open configuration.

DETAILED DESCRIPTION OF THE PREFERRED EMBODIMENT

For a detailed description of the preferred embodiment the reader is directed to the accompanying figures in which like components may be given like numerals for ease of reference.

Figure 1:
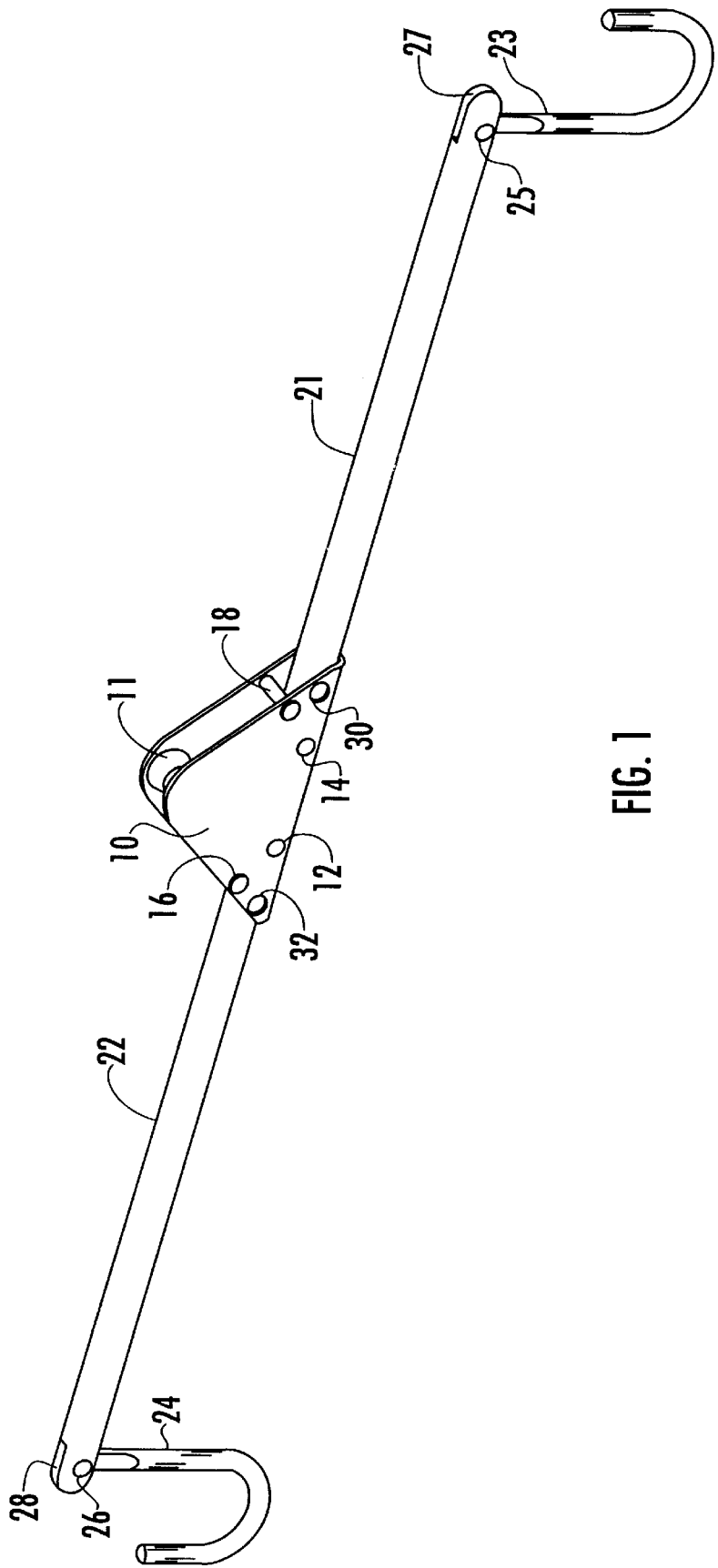
FIG. 1 is an isometric view of the portable gambrel of the present invention.

Referring first to FIG. 1 there is shown an isometric view of a portable gambrel according to the present invention in the fully extended (open) configuration. The gambrel is seen to comprise two sturdy opposing bar steel arms 21 and 22 rotatably attached inside a triangular saddle 10 by pins 12 an 14. Hooks 23 and 24 are suspended at the distal ends on pins 25 and 26 respectively of the bar elements 21 and 22 for hanging a carcass.

Figure 2:
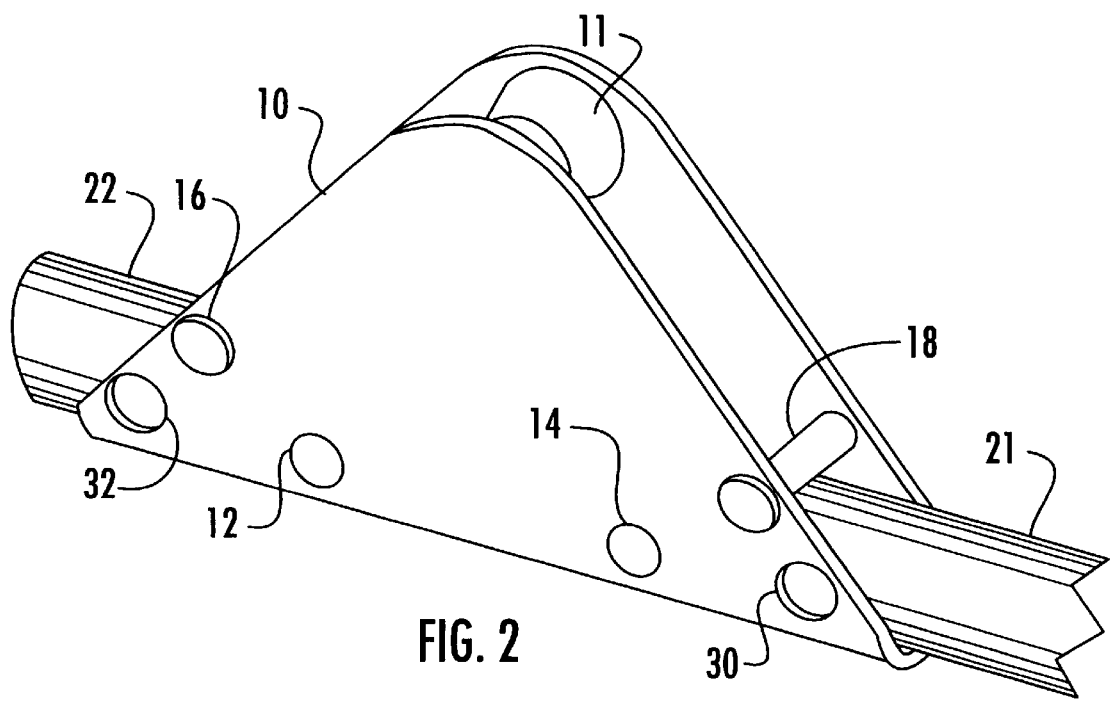
FIG. 2 is an isometric detail of the saddle and bar elements secured therein.

Referring now to FIG. 2, detail of the saddle 10 is shown. The saddle is most easily built by bending a piece of steel plate in a U to conform to the size of the bar arms. The saddle includes a central hanging element 11 at the upper end preferably having a hyperboloidal shape to provide a seat for a rope used to suspend the gambrel. As noted above pins 12 and 14 rotatably secure the arms 21 and 22 within the saddle 10. In the position shown the arms are resting on the bottom formed by the triangular saddle. Pins 16 and 18 are simply shown in a storage position and their function will become clear shortly along with holes 30 and 32 which extend through both sides of the saddle.

Figure 3:
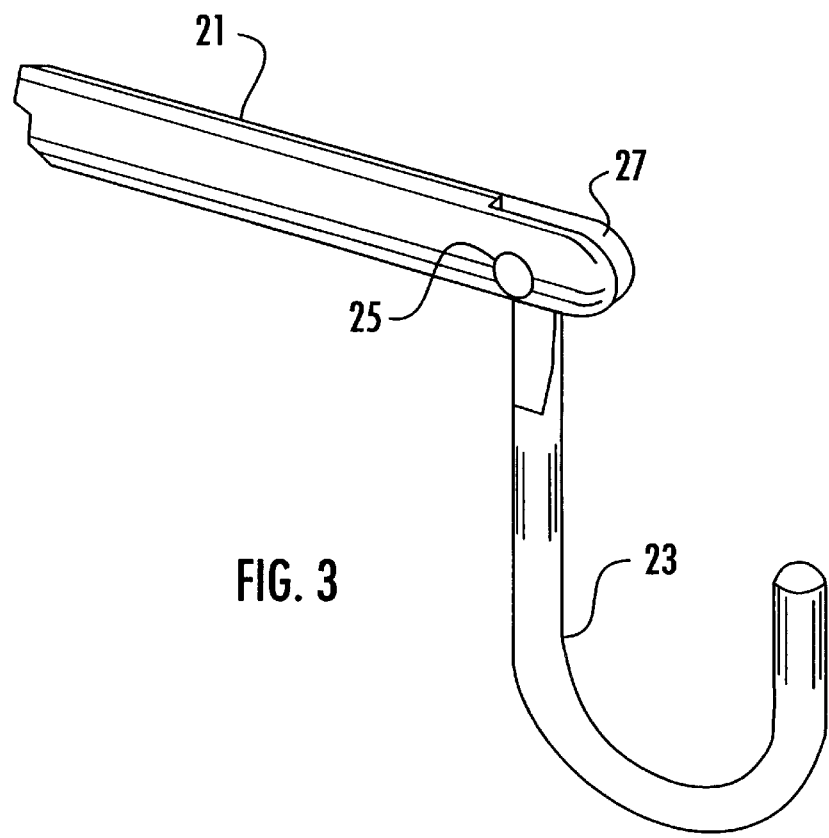
FIG. 3 is an isometric detail of the attachment of one of hooks attached to one of the bar elements.

Referring now to FIG. 3 a detail of the attachment of one of the hooks 23 is shown. One end of the hook 23 is located within a slot 27 at the end of the arm 21 with a pin 25 placed through the end of the arm 21, hook 23 and slot 27 to allow the hook to rotate freely. The pin may be threadedly connected to one side of the arm, bradded or tack welded into place on the outside. The hook 26 on the opposite arm 22 is connected in a similar fashion in a slot 28 by a pin 24 (see FIG. 1).

Figure 4:
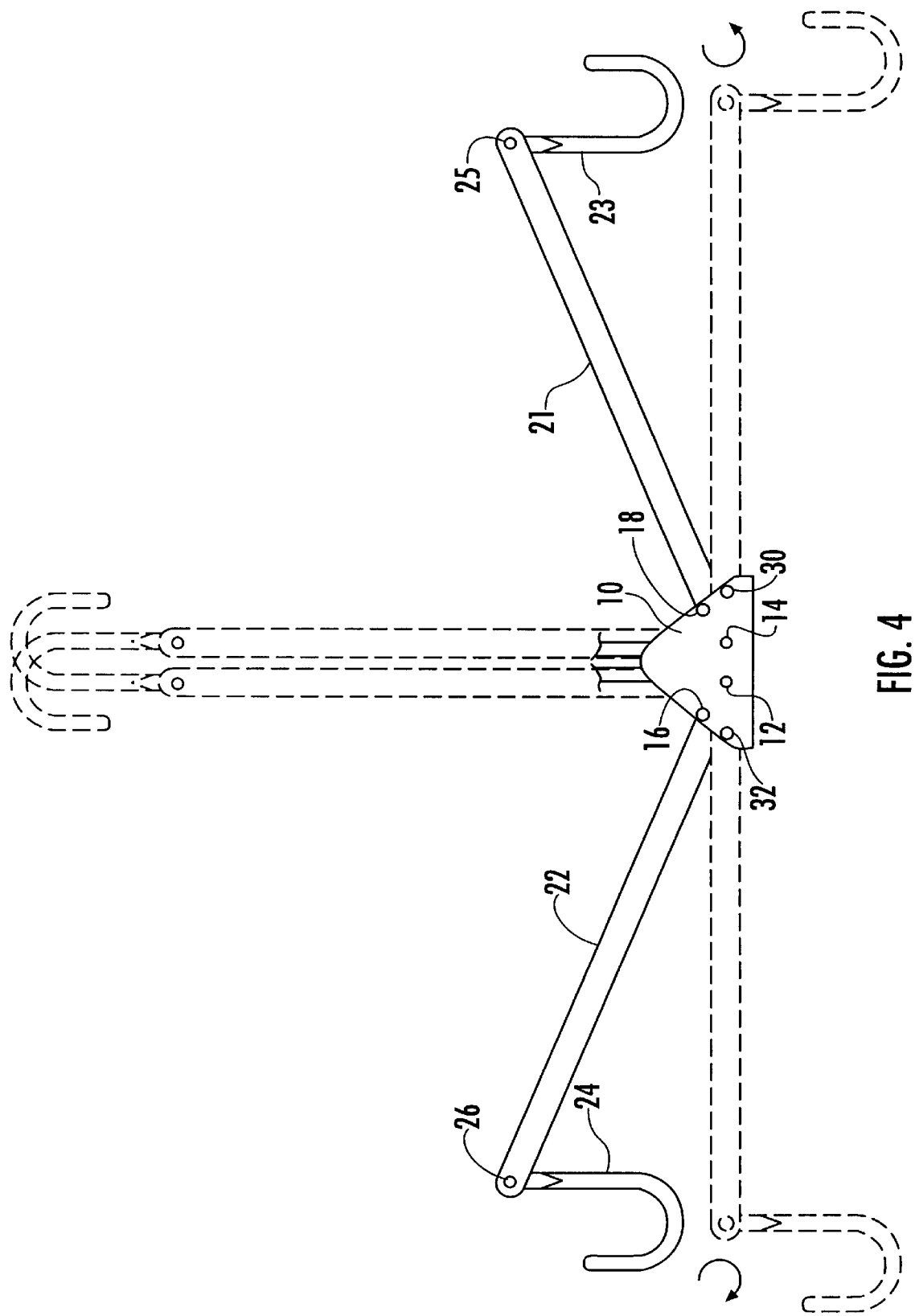
FIG. 4 is front elevational view of the gambrel of the present invention.
Figure 8:
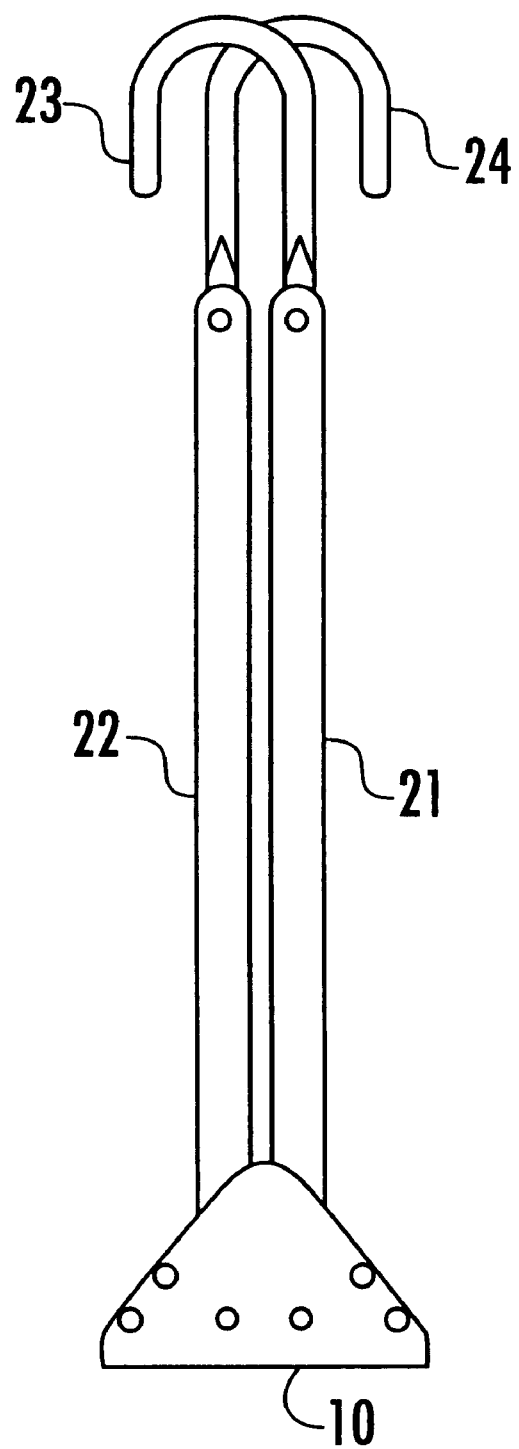
FIG. 8 is a front view of the portable gambrel in the closed or travel configuration.

Referring now to FIG. 4 the folding of the gambrel is illustrated. The arms can be in the horizontal position and rest on the bottom of the triangular saddle as illustrated in FIG. 1 and FIG. 2 and the lower dotted line of FIG. 4. If the carcass is small the arms may be placed in the intermediate position as shown. Pins 16 and 18 are shown removed from their initial position as shown in FIG. 1 and FIG. 2 and placed in the holes 30 and 32. The arms 21 and 22 rest on pins 30 and 32 respectively in a slightly elevated position with respect to the bottom of the triangular saddle 10 which effectively shortens the distance between the hooks 23 and 24. Finally the arms may be positioned vertically in the saddle as shown in the upper dotted line drawing of FIG. 4. The hooks 23 and 24 may be folded together as shown with friction holding the arms in one piece. In the folded position the gambrel may be conveniently carried in a pocket, pack, or on a belt.

In use the triangular saddle 10 is suspended from a limb or other overhead support by a rope or pulley hooked through the central hanging element 11. The desired position for the arms is selected and positioned by use of the removable pins and the carcass attached to the hooks.

The foregoing description of the invention has been directed to a particular preferred embodiment for purposes of illustration and explanation. It will be readily apparent to those skilled in the art that modifications and changes in the apparatus may be made without departing from the scope and spirit of the invention. It is therefore intended that the following claims cover all equivalent modifications as fall within the scope of the invention as defined by the claims.

The invention claimed is:

1. A portable gambrel comprising two arms rotatably secured to and supported by a triangular saddle member, a hook rotatably secured to the distal end of each arm; apertures in the saddle member and removable pins selective insertable therein to position said arms in a position elevated from the bottom of the triangular saddle.

2. The portable gambrel of claim 1 further comprising a central hanging member at the upper end of the triangular saddle member.

3. A portable gambrel comprising:

(a) a triangular U-shaped saddle member having a closed rounded bottom and an open top;

(b) a pair of opposing arms rotatably secured within said saddle adjacent to said bottom such that said opposing arms may be positioned in either a horizontal position or a vertical position;

(c) a pair of hooks, one each of said pair of hooks being rotatably secured to the opposing ends of said arms;

(d) a central hanging member disposed between the opposite sides of said saddle member at said open top; and (e) a pair of removable adjusting pins disposable in either of a pair of apertures such that in one position the opposing arms are horizontal and in a second position said opposing arms are elevated from the horizontal.

4. A portable gambrel for suspending an animal carcass, comprising:

(a) a triangular U-shaped saddle member having a closed rounded bottom and an open top;

(b) a pair of opposing arms rotatably secured within said saddle along said bottom;

(c) a pair of hooks, one each of said pair of hooks being rotatably secured to the distal ends of said arms;

(d) a central hanging member disposed between the opposite sides of said saddle member at said open top; and (e) a pair of removable adjusting pins disposable in either of a pair of apertures such that in one position the opposing arms are horizontal and said hooks are at a first distance in a second position said opposing arms are elevated from the bottom and the hooks are at a second distance.

* * * * *